United States Patent
Mullender et al.

(10) Patent No.: US 10,218,704 B2
(45) Date of Patent: Feb. 26, 2019

(54) RESOURCE ACCESS CONTROL USING NAMED CAPABILITIES

(71) Applicant: CISCO TECHNOLOGY, INC., San Jose, CA (US)

(72) Inventors: Sape Jurriën Mullender, Amsterdam (NL); Hendrikus G. P. Bosch, Aalsmeer (NL); Louis Gwyn Samuel, Swindon (GB)

(73) Assignee: CISCO TECHNOLOGY, INC., San Jose, CA (US)

( * ) Notice: Subject to any disclaimer, the term of this patent is extended or adjusted under 35 U.S.C. 154(b) by 127 days.

(21) Appl. No.: 15/287,454

(22) Filed: Oct. 6, 2016

(65) Prior Publication Data
US 2018/0103037 A1 Apr. 12, 2018

(51) Int. Cl.
| | | |
|---|---|---|
| *H04L 29/06* | (2006.01) | |
| *H04L 12/927* | (2013.01) | |
| *H04L 12/911* | (2013.01) | |
| *G06F 9/455* | (2018.01) | |
| *H04L 9/32* | (2006.01) | |
| *G06F 21/60* | (2013.01) | |

(52) U.S. Cl.
CPC ........ *H04L 63/101* (2013.01); *G06F 9/45558* (2013.01); *G06F 21/604* (2013.01); *H04L 9/3265* (2013.01); *H04L 47/743* (2013.01); *H04L 47/803* (2013.01); *G06F 2009/45587* (2013.01); *H04L 63/0428* (2013.01); *H04L 63/0823* (2013.01)

(58) Field of Classification Search
CPC . H04L 63/101; H04L 63/0876; H04L 9/3247; H04L 67/16; H04L 47/743; H04L 47/803; H04L 67/12; G06F 9/45558; G06F 2009/45587
See application file for complete search history.

(56) References Cited

U.S. PATENT DOCUMENTS

| | | |
|---|---|---|
| 8,112,452 B2 | 2/2012 | Adya et al. |
| 8,776,216 B2 | 7/2014 | Boccon-Gibod et al. |
| 8,935,418 B2 | 1/2015 | Knouse et al. |
| 2009/0092252 A1 | 4/2009 | Noll et al. |

(Continued)

OTHER PUBLICATIONS

Lampson, B., "Chapter 21: Authentication in Distributed Systems," *Distributed Systems*, Editor: Sape Mullender, Published by Addison-Wesley, $2^{nd}$ Edition, Jun. 30, 1993; ISBN-13:978-020162474; 38 pages.

(Continued)

*Primary Examiner* — Brandon S Hoffman
*Assistant Examiner* — William A Corum, Jr.
(74) *Attorney, Agent, or Firm* — Polsinelli PC

(57) ABSTRACT

Aspects of the embodiments are directed to systems, methods, and computer program products embodied at a server managing a resource for providing access to a resource in a distributed network. Embodiments include receiving a request from a client for access to a resource, the request comprising a named capability identifying the resource and identifying a server managing the resource; determining, from the named capability, whether the client is authorized to access the resource identified by the named capability; and granting access to the resource named by the named capability based on the named capability received with the request.

14 Claims, 10 Drawing Sheets

(56) References Cited

U.S. PATENT DOCUMENTS

2016/0366183 A1* 12/2016 Smith .................. H04L 63/06
2018/0091621 A1* 3/2018 Kuo .................... H04L 67/02

OTHER PUBLICATIONS

Lampson, B., "Designing a Global Name Service." Digital Equipment Corporation, ACM, Nov. 1986, 19 pages; http://research.microsoft.com/en-us/um/people/blampson/36-GlobalNames/Acrobat.pdf.

Loscocco, P., et al., "Integrating Flexible Support for Security Policies Into The Linux Operating System", USENIX Annual Technical Conference, Feb. 2001, 62 pages; https://www.usenix.org/legacy/event/usenix01/freenix01/full_papers/loscocco/loscocco.pdf.

Tanenbaum, A., et al., "Using Sparse Capabilities in a Distributed Operating System," ICDCS, May 19, 1986, 11 pages; https://www.researchgate.net/profile/Robbert_Van_Renesse/publication/2952073_Using_Sparse_Capabilities_in_a_Distributed_Operating_System/links/0912f50acf69412805000000.pdf.

* cited by examiner

| Name 402 | Function of Capability 404 |
|---|---|
| SN1 | Identity + Private key (not a capability) |
| SN1/bin | Binary to run (on a file server) |
| SN1/io/ether/l | Access to Ethernet device |
| SN1/io/peer/e | Access to SN2/io/peer/l |
| SN1/io/peer/m | Access to Mgr/io/peer/1 |
| SN1/os | Access to operating system (system calls) |

| Component 502 | Description 505 |
|---|---|
| $P_T$ | Path, identifies (an object/interface on) the target $T$ |
| $K_T$ | Public key of the target $T$ |
| $P_H$ | Path prefix of the holder $H$ |
| Attributes | Attribute/values, shared between $H$ and $T$ |
| Validity | Not valid before/after |
| $P_A$ | Path of signing authority $A$ |
| $\{H(C)\}K_A^{-1}$ | Authority $A$'s signature (signed hash of capability) |

```
┌─────────────────────────────────────┐
│ Encode a request for the resource   │
│ that can only be decoded by a       │
│ server managing the resource using  │  902
│ a named capability for the          │
│ resource                            │
└─────────────────────────────────────┘
                  │
                  ▼
┌─────────────────────────────────────┐
│ Send the encoded request to a       │
│ server managing the resource using  │  904
│ the named capability                │
└─────────────────────────────────────┘
                  │
                  ▼
┌─────────────────────────────────────┐
│ Determine that a signer of a first  │  906
│ named capability is trusted         │
└─────────────────────────────────────┘
                  │
                  ▼
┌─────────────────────────────────────┐
│ Establishing a trust relationship   │
│ for a signer of a second named      │
│ capability and identifier of a      │
│ resource based on determining that  │  908
│ the signer of a first named         │
│ capability is trusted               │
└─────────────────────────────────────┘
```

FIG. 9

RESOURCE ACCESS CONTROL USING NAMED CAPABILITIES

FIELD

This disclosure pertains to controlling access to resources using named capabilities.

BACKGROUND

The Internet of Everything (IoE) brings people, services, data, smart objects, sensors and devices together. Orchestration systems, such as those used in cloud computing, can create virtual networks of virtual machines. These orchestration systems are generic systems using scripts and data bases to create specific networks of processes.

Orchestration systems provide a static way of describing applications that are likely to become dynamic and thus hard to manage well. Orchestration systems can configure and protect distributed applications by creating virtual machines and virtual networks based purely on segregation, which can prove simplistic and unenforceable.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts.

FIG. 4 is a schematic diagram of an example capability list in accordance with embodiments of the present disclosure.

FIG. 5 is a schematic diagram of name-based capabilities fields in accordance with embodiments of the present disclosure.

FIG. 9 is a process flow diagram for requesting resources based on one or more named capabilities in accordance with embodiments of the present disclosure.

DETAILED DESCRIPTION

Figure 1:
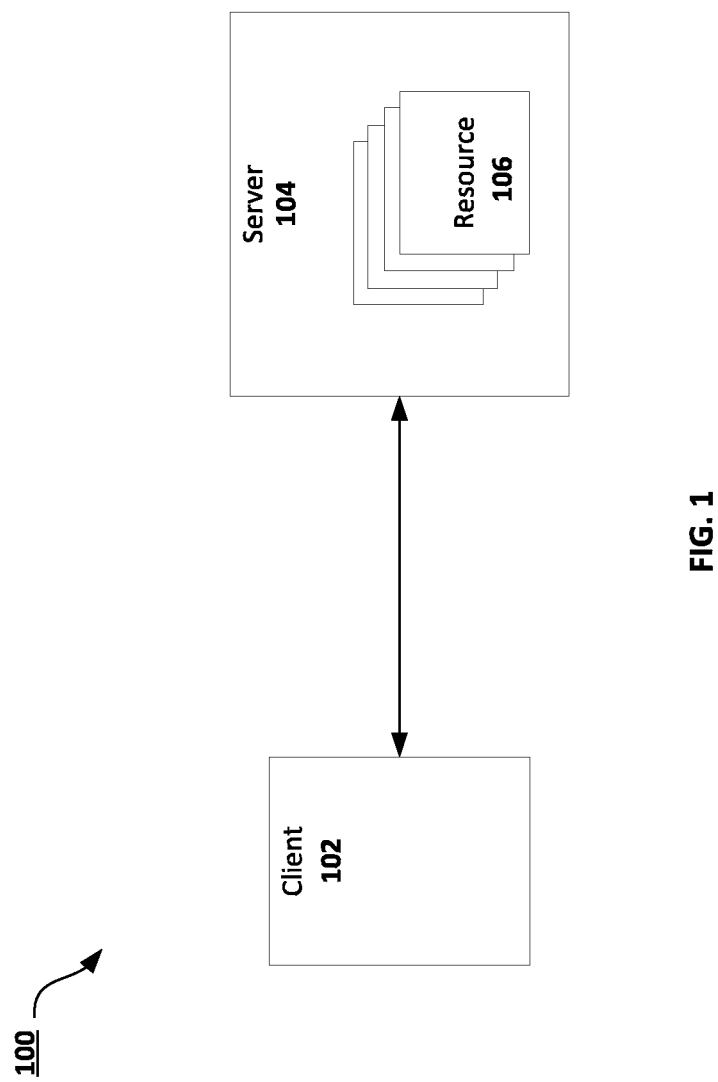
FIG. 1 is a schematic diagram for an example communication system that includes a server managing a resource and a client requesting access to that resource using the server in accordance with embodiments of the present disclosure.

This disclosure describes the use of name-based capabilities to control access to network services and resources, such as those provided by a data center implementing virtualized service functionality. The named capabilities can identify a resource by name, and can be formatted by an extensible certification hierarchy. The named capabilities can provide targeted access to an object, a service, or a hierarchy thereof. The transfer of named capabilities to others can be restricted by the issuer. Any service needs to be capable of issuing capabilities for access to itself or the entities the service manages.

Current practice is to use a software-defined network (SDN) to configure a network environment in which a cloud application is started and to make sure, through this environment, that the application has the correct connections to other entities in the system. In certain instances, the application could access network locations outside of the data center or access unauthorized or unnecessary resources within the data center. This disclosure describes systems, methods, and devices for using name-based capabilities to allow access to resources and/or prevent unauthorized access to resources in a data center environment.

Cloud computing can use orchestration systems that create virtual networks of virtual machines as isolated networks within the Internet. These orchestration systems are generic systems using scripts and data bases to create specific networks of processes. Such orchestration systems have provided a static way of describing applications that are likely to become much more dynamic and more difficult to manage well. Also, such orchestration systems can configure and protect distributed applications by creating virtual machines and virtual networks based purely on segregation: A can talk to B because they are in the same VLAN, but A cannot talk to D because there is no (virtual) path between them.

SDN can be used to configure a network environment in which a cloud application is started and to make sure, through this environment, that the application has the correct connections to other entities in the system. This disclosure describes self-provisioning applications, applications that can reach out into the applications' runtime environment to the entities the applications need to connect to. Moreover, those entities can be prevented from reaching out to other entities they are not supposed to connect to.

Untrusted applications must be prevented from circumventing protection mechanisms, and others must be protected from assault by applications without appropriate authority. These functionalities are described here:

This disclosure describes systems, methods, and devices that provide applications, services, devices, and users, to give them more control over the handling of applications in a virtualized cloud environment. Instead of using external services to configure in minute detail the environment in which applications run, applications should, to the maximum extent, do that configuration themselves.

In this disclosure, applications that are run in a distributed environment have an owner, which is the entity that causes an application to be run and manages it. The owner can be a user device remote to a data center, or can be a server of a data center managing the application on behalf of a remote user. The initial set up of applications involves the owner and the provider of the platform on which the application is run. The owner reserves (possibly pays for) the processing and communication capacity and then allows the applications to start. The owner provides the applications with credentials that allow them to set themselves up in the intricate web of connections they need.

This disclosure describes a naming system that allows all the relevant entities to be identified. The name space is organized hierarchically and the creator of a node in the naming tree owns and controls the subtree of which that node is the root. The naming system allows reasoning of the form:

"If the owner of name /a/b says that the entity with name /a/b/c/d can be trusted, and the owner of /a/b is trusted, then /a/b/c/d can also be trusted."

The name space is designed to allow almost anything to have a name. For example, if /a/b has an attribute named x, then /a/b/x can be used to name the attribute.

Names carry with them the cryptographic machinery that allows the presenter of a name to prove to the owner or manager of the named entity its right to access the entity. It also allows the presenter to verify that the manager of the named entity that is being addressed is not an intruder. This name, along with the necessary cryptographic evidence, is a "capability."

An application will be supplied with all the capabilities it needs to do its work and be secure. The application itself may manage its capabilities or it can make use of a chaperone that supplies those capabilities and controls their use. That is, the chaperone can use capabilities to protect the application from attack and can make sure a misbehaving application does no harm. The application will then be able to create its own connections, make its own resource reservations where possible, and manage its own security.

Security considerations demand that applications running in the cloud can be both protected and restricted:

Protect: Applications must be protected from unauthorized outside access: Applications not designed to be in a hostile environment should not be forced to implement their own protection against attack—the computing environment must protect them.

The manager of an object (e.g., the file system managing a file) needs to verify that the client requesting an operation (e.g., the process that wants to read/write the file) is authorized to do so. To this end, the client can present a capability, signed by an authority that the manager trusts (which could of course be that manager itself) stating that the client (or the application supplied the capability) is authorized to access the object (or the group of objects to which the present object belongs) in the particular way attempted by the client.

Restrict: It must be possible to restrict applications running in the cloud from making undesirable connections or using forbidden resources. Examples: an application that runs in a corporation's virtual intranet must not be allowed to connect to nodes in the open Internet without doing so through an appropriate firewall. An application that shares a processor with an unrelated application should not be able to disrupt that application, either by overconsumption of resources, by hijacking its communication, or by sending it unauthorized messages.

A client that is part of a system or infrastructure (e.g., a process that implements some function) must not be able to access objects or services outside that system or infrastructure without appropriate capabilities. In other words, the user supplying the process has the ability to "sandbox" an application. A process implementing a piece of undesirable functionality, e.g., if its code was written by a malicious programmer, should still not be able to reach out to remote servers, if that process was not explicitly provided with capabilities that allow it to do so.

To carry out these protect and restrict functions, a set of capabilities is provided to each application that can be considered essentially a set of "tickets" that entitle the application to access particular objects and services (sometimes in particular ways only). These capabilities restrict the application to accessing only those objects, networks and services that are open to them.

Symmetrically, a protected application can only be accessed by agents able to present an appropriate capability—the "ticket"—that entitles them to do so.

The term client can be used for the holder of a capability and the term server (or service—a server is an instance of a potentially distributed or replicated service) can be used for the instance that manages the target of a capability; the capability refers to a resource or object that the server or service manages; some resources are servers and then resource and server are one and the same; the terms client and server only indicate roles that processes/applications play. One process can for example be a client and a server at the same time.

Capabilities have the following properties:

1. Unique: The client must be able to trust that only the intended service receives its request and only the intended service can reply.

2. Comprehensible: If the client cannot determine what a capability is for, that capability is useless. Capabilities must be self-explanatory, i.e., they must contain the identity of their target resource (and the server/service managing it).

3. Temporary: Capabilities need an expiration date. Early revocation can be done by the target service which may simply deny service. Without an expiration date, however, every service needs a data base in which it records the validity of extant capabilities (even those discarded by their holders).

4. Unforgeable: It must not be possible to fabricate capabilities that allow unauthorized access to any resource. Capabilities need to have a secret component that only the holder knows, but, in most cases, the holder must also not be able to give a capability away to an unauthorized entity. This can be achieved using cryptographic protection based on both the holder's identity and the identity of the target service.

To see how capabilities can be used, consider an organization's firewalls running in a data center. The firewall application(s) will each receive a capability that allows them to connect to the Internet. No other applications will be provided with this capability.

Instead, other applications may receive a capability that allows them to connect to one of the firewalls as their Internet capability. Thus, an application will only be able to reach the Internet via one of the firewalls if the application has such a capability. There is no need to configure vLANs, or tunnels to achieve this for purposes of security (although it still may be done for performance reasons).

Aspects of the embodiments are directed to a method performed at a server managing a resource for providing access to a resource in a distributed network. The method includes receiving a request from a client for access to a resource, the request comprising a named capability identifying the resource and identifying a server managing the resource; determining, from the named capability, whether the client is authorized to access the resource identified by the named capability; and granting access to the resource named by the named capability based on the named capability received with the request.

Aspects of the embodiments are directed to a hardware computer configured to manage a resource and is connected to a network. The hardware computer includes at least one memory element having instructions stored thereon and at least one processor coupled to the at least one memory element. The at least one processor can be configured to execute the instructions to cause a chaperone hosted by the hardware computer to receive a request from a client for access to a resource, the request comprising a named capability identifying the resource and identifying a server managing the resource; determine, from the named capability, whether the client is authorized to access the resource identified by the named capability; and grant access to the resource named by the named capability based on the named capability received with the request.

Aspects of the embodiments are directed to a computer-readable non-transitory medium comprising one or more instructions for allocating resources in a virtual network. The instructions when executed on a processor are operable to receive a request from a client for access to a resource, the request comprising a named capability identifying the resource and identifying a server managing the resource; determine, from the named capability, whether the client is authorized to access the resource identified by the named capability; and grant access to the resource named by the named capability based on the named capability received with the request.

Aspects of the embodiments are directed to a method performed by a client requesting access to a resource in a distributed network. The method can include using a named capability for the resource to encode a request for the resource that can only be decoded by a server managing the resource, and send the encoded request to a server managing the resource. In some embodiments, the request is encoded such that the server managing the resource can decode the request if the server is identified in the capability, and wherein a server managing a resource that is not identified in the capability cannot decode the request.

Aspects of the embodiments are directed to a computer-readable non-transitory medium comprising one or more instructions for a client to communicate with a server managing a resource in a distributed network. The instructions when executed on a processor can be operable to use a named capability for the resource to encode a request for the resource that can only be decoded by a server managing the resource, and send the encoded request to a server managing the resource. In some embodiments, the request is encoded such that the server managing the resource can decode the request if the server is identified in the capability, and wherein a server managing a resource that is not identified in the capability cannot decode the request.

Aspects of the embodiments are directed to a hardware computer configured host a client, the client configured to communicate with a server managing a resource that is connected to a network. The hardware computer can include at least one memory element having instructions stored thereon and at least one processor coupled to the at least one memory element. The hardware computer can be configured to execute the instructions to cause a chaperone hosted by the hardware computer to use a named capability for the resource to encode a request for the resource that can only be decoded by a server managing the resource, and send the encoded request to a server managing the resource. In some embodiments, the request is encoded such that the server managing the resource can decode the request if the server is identified in the capability, and wherein a server managing a resource that is not identified in the capability cannot decode the request.

Some embodiments can also include denying access to the resource based on a capability that does not provide authorization for the client to have made the request.

In some embodiments, determining, from the named capability, whether the client is authorized to access the resource identified by the named capability is performed by a chaperone service function residing within a communication path between the client and the server managing the resource.

Some embodiments can also include preventing the server managing the resource from receiving a request for access to the resource unless the request is verified and determined to be permissible by the chaperone.

In some embodiments, the chaperone is provided by a hypervisor, and wherein the server is a virtual machine managed by the hypervisor.

In some embodiments, the chaperone is provided by an operating system, and wherein the server runs in a container managed by the operating system.

In some embodiments, the chaperone is provided by a software library that is compiled with an implementation of the server.

In some embodiments, the chaperone resides in a network switch or interface associated with a host device hosting the server, and is configured to provide or deny communication for the server.

In some embodiments, determining, from the named capability, whether the client is authorized to access the resource identified by the named capability includes identifying a signer of the named capability; determining that the signer of the named capability is trusted based on a name of the signer in the named capability; looking up a key of the signer to confirm authorization of the signer to the named capability; matching a name of a resource in the capability to a name of a managed resource; verifying that the client making the request is a client authorized by the capability; and verifying whether an operation requested is listed as an operation that the named-capability authorizes.

In some embodiments, the server that can decode the encoded request holds a private key that matches a public key in the capability.

Some embodiments can include providing a request that includes a named capability that authorizes the client to make the request for the resource and client-authentication information.

In some embodiments, the named capability is a first named capability and a resource named in the first named capability is a second named capability. Some embodiments can include determining that a signer of the first named capability is a trusted entity; and based on determining that the signer of the first named capability is a trusted entity, establishing a trust relationship for the signer of the second named capability and the identifier of the resource in the second named capability.

In some embodiments, the named capability comprises a hierarchical path name that identifies the resource.

In some embodiments, the hierarchical path name that identifies the resource comprises a prefix that is a root name that identifies a trusted signer of the named capability. In some embodiments, the signer of the named capability is trusted by the client; and based on the hierarchical path name and the trusted signer of the named capability, the client trusts the resource and the server managing the resource.

In some embodiments, using the named capability is performed by a chaperone service function residing within a communication path between the client and the server managing the resource.

FIG. 1 is a schematic diagram for an example communication system 100 that includes a client 102 and a server 104 managing a resource in accordance with embodiments of the present disclosure. Client 102 can be a user device, such as a computer, workstation, laptop, mobile device, or smartphone, or other device. Client 102 and server 104 can each be an application running on an operating system. Client 102 can communicate with a server 104. For example, client 102 can communicate with a server across a network. In some embodiments, client 102 can communicate with a server 104 across a virtual network configured by a hypervisor.

The client 102 or the server 104 can be a hardware computer with an operating system that can provide virtual machines (VMs) and corresponding resources to run applications. The client 102 or the server 104 can also be an application that provides VM functionality. The server 104, for example, can manage one or more resources 106. The client 102 can communicate with the server to access one or more resources 106 managed by the server 104.

The client 102 can make a request for a resource. For example, the client 102 can send a request for a resource to a server 104. The request includes a named capability that names a resource. The named capability can also name a server managing the request that provides the resource, for example, through a recognizable name, which can be translated into a server address, such as a URL. In embodiments, an intermediate mechanisms can receive the request and direct the request to the server based, at least in part, on the named capability listed in the request. The intermediate mechanism can perform the translation of the name in the named capability to an address of the server.

The server 104 managing the resource can receive the request. The server 104 can verify the capability through a verification procedure described below. The server 104 can identify a resource named in the named capability and satisfy the request for the resource.

In embodiments, the server and the resource can be the same. For example, a server 104 can provide one or more resources 106. In some embodiments, the server 104 can be configured to provide a single resource.

In embodiments, the server can host a chaperone function that makes a decision as to whether to allow the granting of the resource request to the client based on the named capability.

Figure 2A:
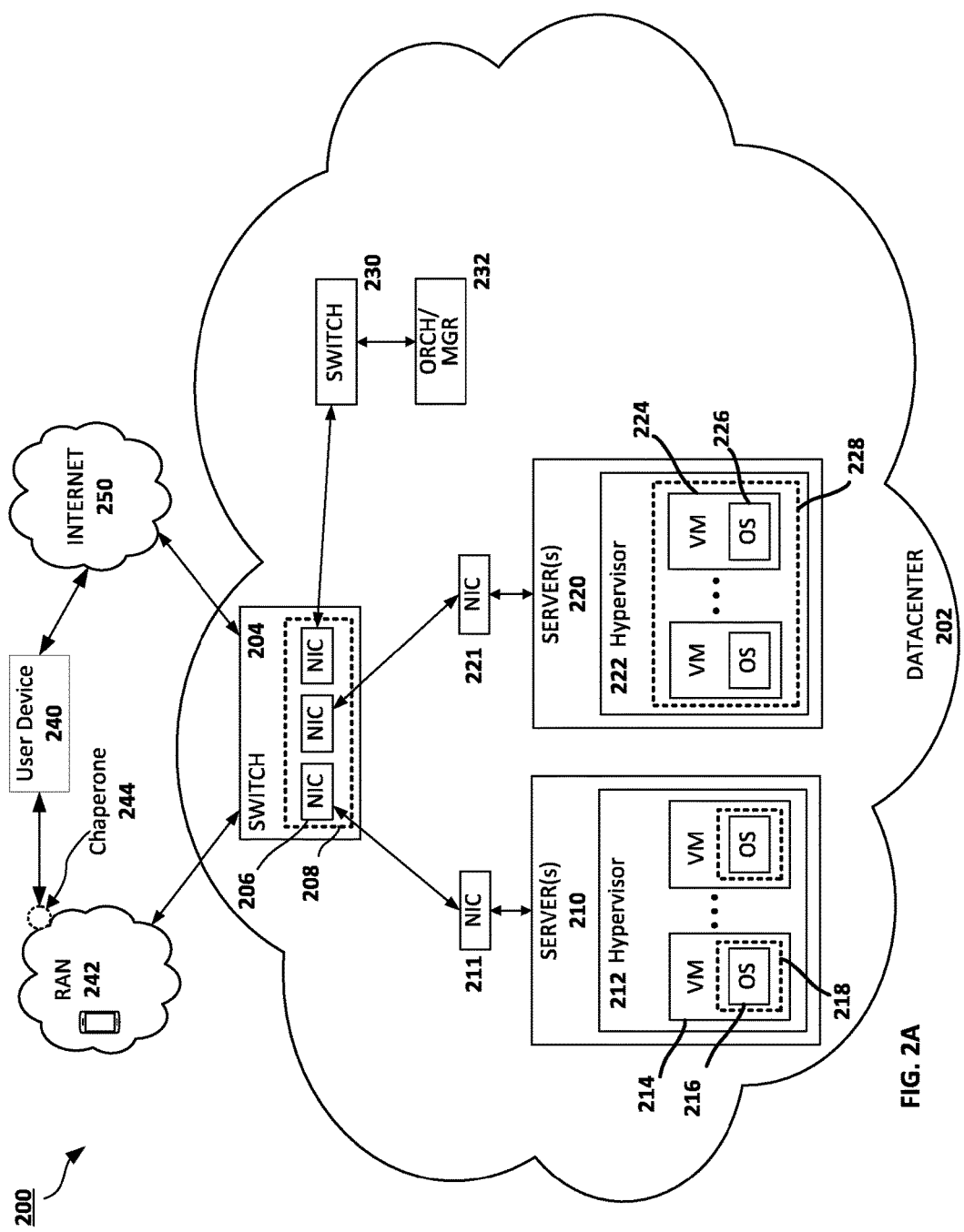
FIG. 2A is a schematic diagram of a computing system in accordance with embodiments of the present disclosure.

FIG. 2A is a schematic diagram 200 of an example datacenter 202 in accordance with embodiments of the present disclosure. The data center 202 can include one or more switches 204. Switch 204 can route data and control traffic through a network interface card (NIC) 206 to one or more servers, such as server 210 or server 220. Server 210 can include a NIC 211 that can be used to send packets to and receive packets from the switch 204 (e.g., via NIC 206). The server 210 can host one or more virtual machines (VM), such as VM 214. A hypervisor 212 can manage the VMs and can provide virtual networks to connect VMs together.

VM 214 can include an operating system (OS) 216. The OS 216 can provide service functionality for the VM or can act as an operating system to provide application services for the VM. The VM can provide firewall services, filing systems, service functions, and other application functions.

To run an application, what is needed is the application itself, i.e., the program to run, plus the capabilities that allow the program to access the resources it needs to run. Those resources can include:
  identity: the ability to authenticate as a particular principal;
  processing resources: processor cycles, scheduling reservations, memory, etc.;
  device access: network devices, disks, displays, etc.;
  server access: file servers, name servers, time servers, etc.; and/or
  peer access: other components in the (distributed or parallel) application.

All of these, except the identity, are provided to the application in the form of named capabilities that give access to the resource in question. Named capabilities can be delivered as a named capability list, that includes {name, capability} pairs, where the name identifies the capability's purpose to the application as well as to the support system that actually starts the application. The named capability list also includes an identity plus private key that the application must use to verify incoming calls and prove its identity on outgoing ones.

Since the support system (operating system, cloud provisioning service, etc.) also needs to know what program to run, the following can be added to the itemized list:
  software: the program to be run.

Again, this software item would be represented by a {name, capability} pair.

Naming conventions will be an essential ingredient to making all this work: by using standard names for software, resources, interfaces, etc., applications and application-support services can make things happen as intended.

An application can access resources by showing the capability that allows it to do so. Resources are not just servers, but also machines, networks, or network interfaces, file systems, etc.

Resources and services are named and accessed via name-based capabilities. The access control function consists of checking capabilities for validity and following certification chains to make sure that the holder of a capability is legitimate. This requires activity on both the client and server side of the conversation: the client must prove its identity and verify the server's identity, while the server verifies the client's identity and proves its own identity. A chaperone is a term used for the entity carrying out these access control functions. A chaperone thus represents any entity that can be accessed using a capability, both on the client and server side. Passive entities, such as network interfaces, disks, disk images may have a process associated with them that implements their chaperone function.

In certain cases, applications are placed in a container that supervises their communication and makes sure that all conversations are capability based, that no capabilities are used that do not belong to the authorized set, and that all communication is properly authenticated and encrypted.

The term chaperone can be a generic term used herein for such a container. A chaperone is a trusted application that manages the keys and capabilities for the processes it contains, which are the chaperone's wards. It runs the process (or processes) in a way that all communication must pass through the chaperone. The chaperone then initiates connections on the ward's behalf, using only the capabilities and keys entrusted to it.

Chaperones are, in the authentication terminology, principals that authenticate themselves as the entity they represent and guard (such as client 102 or server 104). Entities are accessed by name, so names and chaperones are naturally paired; a chaperone speaks for the name. Each name is managed by a chaperone and a chaperone manages a name or a set of names (a piece of a subtree, in some cases).

In embodiments, an application can be its own chaperone. The application that acts as its own chaperone would be a trusted application, to the extent that a chaperone would be trusted. An application that acts as its own chaperone would manage its own capabilities.

In embodiments, a chaperone can be hosted by an entity that manages the application. In cases where an application does not manage its own capabilities, such as legacy applications, the chaperone that is hosted by an entity that manages the application can use capabilities to control access to one or more resources.

Chaperones at lower levels in the naming hierarchy (nearer the root) can certify the identity of those at higher levels. Chaperones control the subname space rooted at their name: a chaperone can only be given a name if the chaperone with the longest existing prefix name allows it.

At the lowest levels, the hierarchical organization will be assumed to follow that of the Internet Domain Naming System (DNS) allowing any entity in the network to find chaperones by name. Each organization using chaperones should, therefore, install one at or near the root of the organization's name space.

Wards may have copies of the capabilities held by the chaperone, or they may have references to them. Wards could use the same library interfaces that unchaperoned processes use, except here, the library implementation asks the chaperone to do the connection initiating, instead of the library itself.

As an example implementation, an operating system can be used as a chaperone for the processes it manages. Another example is a network hardware element that implements a chaperone function (just like Ethernet hardware today filters out packets not intended for the host).

An example ward can include a virtual machine, with the hypervisor helped, perhaps, by additional processes or libraries—taking the role of chaperone. Processes in containers (e.g., LXC) could also be viewed as wards. Hybrid models are possible too. A legacy application running in a VM or container could have a companion process acting as its chaperone. In this case, the chaperone is not so much there to guarantee the process does not misbehave, but to set up capability based communication channels for it.

Returning to FIG. 2A, the chaperone can be embodied in one or more locations in datacenter 202. Generally, chaperones are indicated by dotted lined boxes in FIG. 2. For example, a chaperone 218 can be embodied by the OS 216. The chaperone 218 can use named capabilities received in a request for the service provided by VM 214 to determine whether the request for the resource should be granted or whether the request should be denied.

Other embodiments of the chaperone are also described herein. For example, the datacenter 202 can include a server 220 that can communicate with switch 204 via NIC 221. The server 220 also includes a plurality of VMs, such as VM 224. Each VM can include an operating system, such as OS 226. The VMs can be managed by hypervisor 222. In embodiments, the chaperone 228 can be embodied in the hypervisor 222. The chaperone 228 can ensure that the virtual machine resources are not provided to a requestor unless the request includes verified capabilities for the resources managed by server 220. The chaperone 228, therefore, can prevent the unauthorized access of any VM hosted (or, more specifically, resource provided) by the server 220.

In some embodiments, a chaperone 208 can be embodied on a network switch 204. Chaperone 208 can determine whether to route traffic to one or more servers within the datacenter 202 (such as server 210 or server 220) based on one or more named capabilities in a request received at the switch by a requester of services.

In some embodiments, a chaperone 244 can be embodied as part of radio access network 242. A user device 240 can access the datacenter 202 through the RAN 242 or through the Internet 250. The chaperone 244 can control how the user device 240 can access the datacenter 202 based on one or more named capabilities the user device 240 sends to the datacenter 202 through the RAN 242 and chaperone 244.

The datacenter also includes an orchestrator/manager (Orch/Mgr) 232. Orchestration in distributed processing is a term for organizing a number of components in a particular configuration. The Orch/Mgr 232 can be in charge of starting up all the components to form an integral whole, will have to generate names for the components and names for the interfaces on those components in a way that the components are prefixes of the interfaces. The Orch/Mgr 232, once it is in possession (or has generated) all the names, can then generate all the capabilities such that all interfaces that are supposed to be connected can be connected using the correct capabilities. As a side effect, all interfaces that are not supposed to be able to connect, will not be able to connect, at least not by using capabilities. Orch/Mgr 232 can communicate with one or more servers through a switch 230.

Figure 2B:
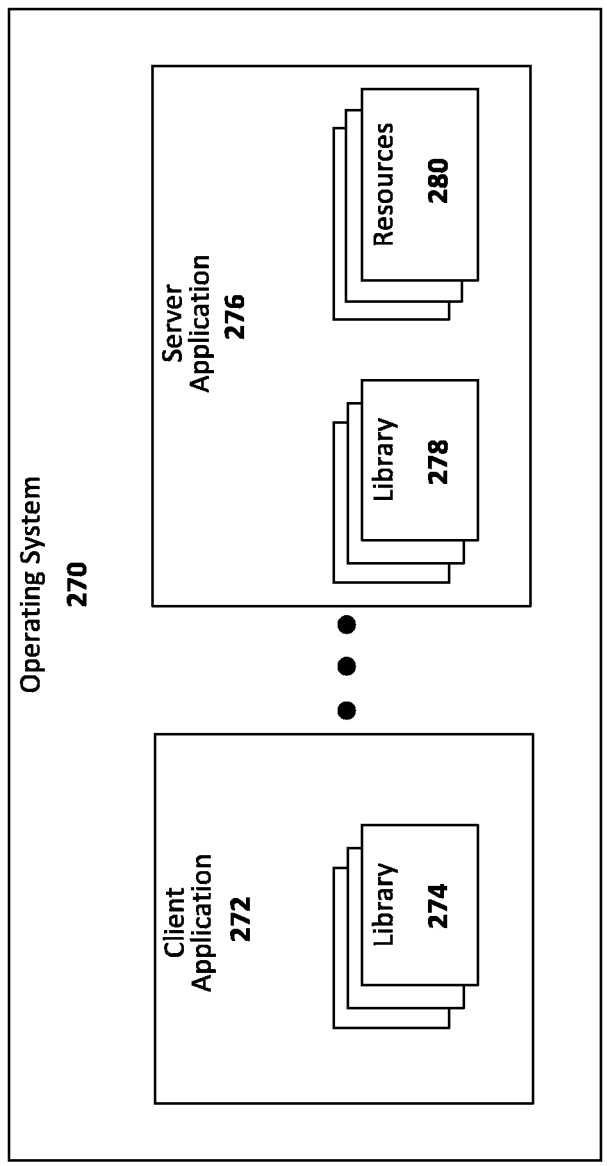
FIG. 2B is a schematic diagram of an example operating system in accordance with embodiments of the present disclosure.

FIG. 2B is a schematic diagram of an example operating system (OS) 270 in accordance with embodiments of the present disclosure. Operating system 270 can be similar to OS 216 or OS 226 described in FIG. 2A. OS 270 can run a client application that includes one or more file libraries 274. Each of file libraries 274 can act as a chaperone for using capabilities to encode requests to the server application 276 to access one or more resources 280. The server application 276 can also include file libraries 278. Each file library 278 can act as a chaperone to protect against potentially harmful accesses to one or more resources 278 by the client 272.

Figure 3:
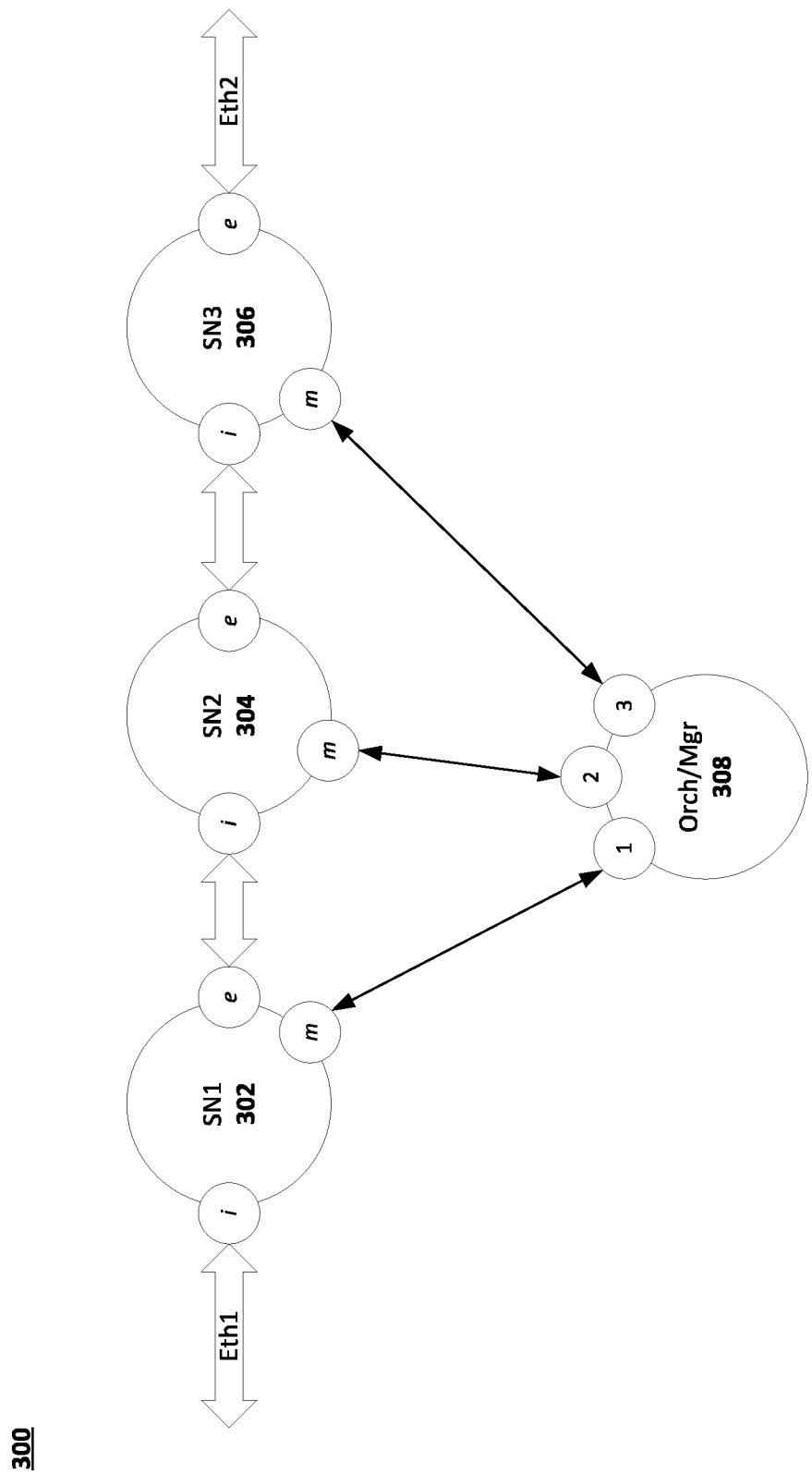
FIG. 3 is a schematic diagram of a network orchestrator in accordance with embodiments of the present disclosure.

FIG. 3 is a schematic diagram of a datacenter architecture 300 in accordance with embodiments of the present disclosure. This disclosure describes how capabilities can be implemented given various types of existing applications. FIG. 3 is used to guide the discussions. In general, two main goals need to be achieved:

1. Viewed externally, even a legacy application should use capability-based communication and should not be distinguishable from an application written expressly to use capabilities.

2. Viewed internally, the capability-based connections must be presented as something that fits the legacy nature of the application at hand. Unmodifiable legacy applications, such as those that can only run in a VM because there's no way to modify them or their support platform, must still be usable.

FIG. 3 shows an example with four component applications connected in a particular topology. Service node SN1 302, for example, has three interfaces, one to an external network (network not shown), one to the next service node SN2 304, and one to a management node Orch/Mgr 308. Orch/Mgr 308 can be an orchestrator as described herein.

Applications such as SN1 302 must be able to distinguish these interfaces because each has a particular purpose. Consider the communication between SN1 302 and SN2 304 in FIG. 3. Either SN1 302 must establish a connection to SN2's ingress interface i, or SN2 304 must establish a connection to SN1's egress interface e. At least one of these processes needs a capability for the other. For simplicity, flexibility and symmetry, in a scenario as shown in FIG. 3, both processes have capabilities for the other so that either can take the initiative to establish a connection. Moreover, each process can use that capability not just to connect, but also to verify the other's incoming connection.

Similarly, SN2 304 can an egress interface to an ingress interface of SN3 306.

The following subsections will sketch a number of application scenarios and show how capability-based communication might be fitted in.

To make the scenarios below concrete, an example capability list for the startup of SN1 302 of FIG. 3, is shown in FIG. 4. FIG. 4 is a table illustrating a capability list 400 for starting SN1 302 of FIG. 3. The capability list 400 includes a set of names 402, which names resources that the requestor is authorized to access. The capability list 400 also includes a list of functions of each capability 404. SN1 302 includes the following capabilities:

SN1/bin which is a capability to run on a file server;

SN1/io/ether/I which is a capability to access the Ethernet device;

SN1/io/peer/e which is a capability to connect to SN2 304 egress e;

SN1/io/peer/m which is a capability to connect to Mgr 308; and

SN1/os which is access to the operating system.

The capability list also includes an identify of SN1 302 and a private key.

To run an application on a host, one creates a connection to its operating system (using named capability SN1/os) and then uses the connection to send a request to create the application. This request will also have the capability list in it. When the operating system starts the application, it passes the capability list on to the application.

The operating system returns a capability to the requester that allows the requester to manage/control the application. Note that an operating system has to be trusted by the applications that run on it and that applications cannot keep secrets from the operating system. Delivering the capability list for an application, including the application's secret key, via the operating system (or hypervisor), therefore, is not a breach of security. Note also that each instance of an application will use its own private (i.e., secret) key. Should a secret key be accidentally revealed, then the damage is restricted to that application.

Application A's name should have a prefix of owner O's choosing, because O generates the capabilities that A must use to connect to the outside world. System S should be viewed as a supplier of the infrastructure that allows O to run A. S supplies the network addresses at which A can be found, so S should tell both A and O so that they can set up the name space that allows A to be found by its clients.

Owner O can refer anybody to an address anywhere because the correctness of the referral is tested as soon as capability-based authentication happens. There is never any danger of rogue connections and that is the strength of this system. The name service (e.g., DNS) is not part of the trusted computing base.

Capabilities

A capability can be considered a statement of the form: "The legitimate bearer of this message is entitled to access this named entity/object in the manner described" Passports can be viewed as capabilities for travel to foreign countries. Theatre tickets are capabilities for attending a play. A user's password is a capability for being allowed into a computer system or application.

In a distributed environment, such as in a datacenter environment or a cloud computing environment, the named capabilities can be enhanced to include the following:

a) signed capabilities so they can be kept in user space, but need a simple and extensible certification hierarchy b) capabilities that can provide targeted access to an object, a service, or a hierarchy thereof c) capabilities whose transfer to others can be restricted by the issuer d) any service needs to be capable of issuing capabilities for access to itself or the entities it manages Therefore, the abstraction of a capability for a distributed system in accordance with embodiments of the present disclosure can be:

Authority A grants entity C the right to access entity S using methods $M_1, \ldots M_n$. This disclosure includes using hierarchical path names to identify principals A, C, and S.

Additionally, principals can use public key cryptography for authentication. These path names may take the form of conventional file names (e.g., /organization/service/object), DNS names (e.g., service.company.com), the two previous forms can be combined in the form of a URL (e.g., http://service.company.com/object/-subobject), or they can another, not yet defined, form.

The essential properties of paths are that each path defines a set of prefixes. The path /a/b/c/d has prefixes /a/b/c/d (each path is a prefix of itself; this is important), /a/b/c, /a/b, /a, and / (the empty prefix which is represented by a pathname separator, /, all by itself) and that a principal A with path name $P_A$ has control over a principal B, if $P_A$ is a prefix of B's path name $P_B$. Since $P_B$ is a prefix of itself, this rule implies that B has control over itself This property has an analogy in file systems where settings of directory /usr can prevent access to /usr/joe. In effect, /usr has (some) control over /usr/joe. For example, in web applications, http://company.com has "control" over http://company.com/research.

The methods $M_1, \ldots M_n$ in the abstraction above describe what C, the holder of the capability, is allowed to do with the entity S. What this is, or can be, depends on the entity S and this cannot be further defined here. In the representation of a capability, these methods are expressed by a series of attribute/value pairs: each attribute has a name and a value.

FIG. 5 is a schematic diagram of name-based capabilities fields in accordance with embodiments of the present disclosure. FIG. 5 is a table 500 of example name-based-capability fields. Each field can include a component 502 and a description of a function 505. As shown in FIG. 5, a name-based capability (NBC) contains the following fields:

$P_S$ The path of the entity the capability gives access to. Capabilities typically provide access to entities with any path that has $P_S$ as a prefix (which include $P_S$ itself). Attributes may influence this.

$K_S$ The public key of S, provided to the holder of the capability to enable it to authenticate S on first access. This extends the functionality of a capability with that of a certificate.

$P_H$ The path prefix of the holder H. Only entities whose paths have $P_H$ as a prefix will be allowed to use this capability. Unless other arrangements are made, holders will have to provide certificates that couple their paths to their public keys (and then holders will have to provide proof of identity by using the associated secret key). This key is not included in the capability because many paths and, therefore, many holders with different public keys may have PH as a prefix.

$P_A$ The path of the signing authority. The signing (public) key $K_A$ can also be included, but anybody verifying the capability will need external evidence that $K_A$ is the key associated with $P_A$ in any case, so there's no advantage in doing this unless there are multiple keys for $P_A$.

In addition to this, the capability may have a set of zero or more attributes and it must include a period during which the capability is valid (which is the case in certificates too).

The capability is signed in the conventional manner for certificates: by encrypting a secure hash of the capability's body with the signer's secret key (cf. X.509).

Important properties of capabilities are these:

1. S must trust A to accept a capability. If $P_A$ is a prefix of $P_S$ then this is automatically the case. If not, external mechanisms must be used to establish S's trust in A.

2. H must trust A to provide the correct key for S. If $P_A$ is a prefix of $P_S$ then A may be assumed to be in control of S, so if H is convinced that $K_A$ is associated with $P_A$, then H will trust the contents of the capability.

A capability can be turned into a certificate by setting $P_H$ to the empty path (anybody can use it) and adding a certificate attribute (which essentially means: "this capability doesn't empower any operations, it merely says that the key of $P_S$ is $K_S$").

Thus, named capabilities described herein can include the following advantages:

a) Capabilities are signed and can be kept in user space. The certification hierarchy simply follows the name space, is simple to manage and the trust relationships are clear and simple.

b) Capabilities provide access to a named service, plus the subtree rooted by the service's name (attributes may be used to restrict access both in terms of operations and subtree access)

c) Capabilities are only valid for entities that can authenticate as being authorized denizens of the holder's path. A special case occurs when the holder's path is empty because that path is a prefix of every path and obviates the need for holder authentication.

d) Any service can issue capabilities for access to itself and the entities it manages because the signer's path is the service path and, therefore, a prefix of it.

The components of a capability are shown in FIG. 4. A capability as described there does two things:

1. It states that $K_T$ (i.e., the owner of private key $K_T^{-1}$) speaks for path $P_T$. One could also interpret this as: the owner of private key $K_T^{-1}$ has path $P_T$.

2. It states that any principal with path P, where $P_H \subseteq P$, may establish communication with T to access the object identified by $P_T$.

Capabilities are at the basis of all communication in the system.

If $P_H$ were empty (the root path), anybody in possession of the capability is allowed to use the service it represents. A capability doubles as a certificate: A says $K_T$ speaks for $P_T$.

An additional rule: if $P' \subseteq P$, then A speaks for P' AND A speaks for P. With this rule in hand: If it is believed that A speaks for a prefix of P and that a capability that essentially contains: A says $K_T$ speaks for P, it can be concluded:

A says $K_T$ speaks for P ∧ A speaks for P AND P says $K_T$ speaks for P

P says $K_T$ speaks for P and $K_T$ speaks for P

In other words, the statement in the capability can be believed, provided it is believed that A speaks for a prefix of P.

A set of root certificates can be established that say "$A_/$ speaks for /" (/ represents the empty path which is a prefix of every path). The root CA (Certification Authority or, Capability Authority) $A_/$ can thus speak for any path. It need not do so, however; it may speak for an intermediate CA and authorize it to speak for a nonempty prefix, e.g., "$A_/$ says $A_{company.com}$ speaks for company.com." And $A_{company.com}$ can then speak for any path in Company.

The holder of a capability is identified only by path prefix $P_H$. A server S will not believe a client C's communication if C merely says its path is $P_C$, where $P_H \subseteq P_C$. The server needs evidence that client C speaks for $P_C$. To this end, C should supply to S a certificate (or a capability) of the form A says $K_C$ speaks for P', where $P' \subseteq P_C$. In general, certificate (or capability) chains are needed that will eventually link a universally trusted root CA to the client's right to speak for its path via a number of intermediate CAs for path prefixes of ever increasing length.

Capability-Based Communication

Communication is initiated by clients. A client C must have a capability containing the path $P_T$ of (an object or interface on) a server S, the server's public key $K_T$, and a prefix of its own path $P_H$. C must also have its own public key pair $\{K_C, K_C^{-1}\}$, the path PC of (an interface on) the client—$P_H \subseteq P_C$—and the certificates to link those to a path that is a prefix of $P_C$.

C uses a name server (which could be (dynamic) DNS, a combination of DNS and purpose built name servers or even a URL lookup) to map $P_T$ to the address of S and it establishes communication with S by sending it the capability and the necessary certificates. Note that the server's path serves two purposes—(1) it allows the server to be found and (2) it allows the server to be identified for purposes of authentication—while the client's path is only needed to allow the client to be identified for authentication.

After this, a handshake protocol between client and server (e.g., IKE, the Internet Key Exchange protocol, or TLS, the Transport-Layer Security protocol) is used to mutually verify the identities of C and S and to establish a session key $K_{CS}$ for the encryption of the remainder of the conversation between C and S. For this, C and S both need their private keys, $K_C^{-1}$ and $K_T^{-1}$, respectively.

A conversation between a client C and a server S thus consists of an unencrypted preamble that does contain encrypted components and follows a standardized protocol, followed by a conversation encrypted with the session key established through that protocol. The encrypted conversation may use any communication protocol whatsoever.

Servers only accept connections from clients that present correct capabilities and that can then authenticate themselves as controlling their paths.

The authentication between C and S happens once, at connection establishment, allowing the relatively high computational cost of authentication using public key encryption, to be amortized over the conversation. Connections could be garbage collected after being idle for a sufficiently long period and they could be automatically (re)established (e.g., by a communications library) as required.

Figure 6:
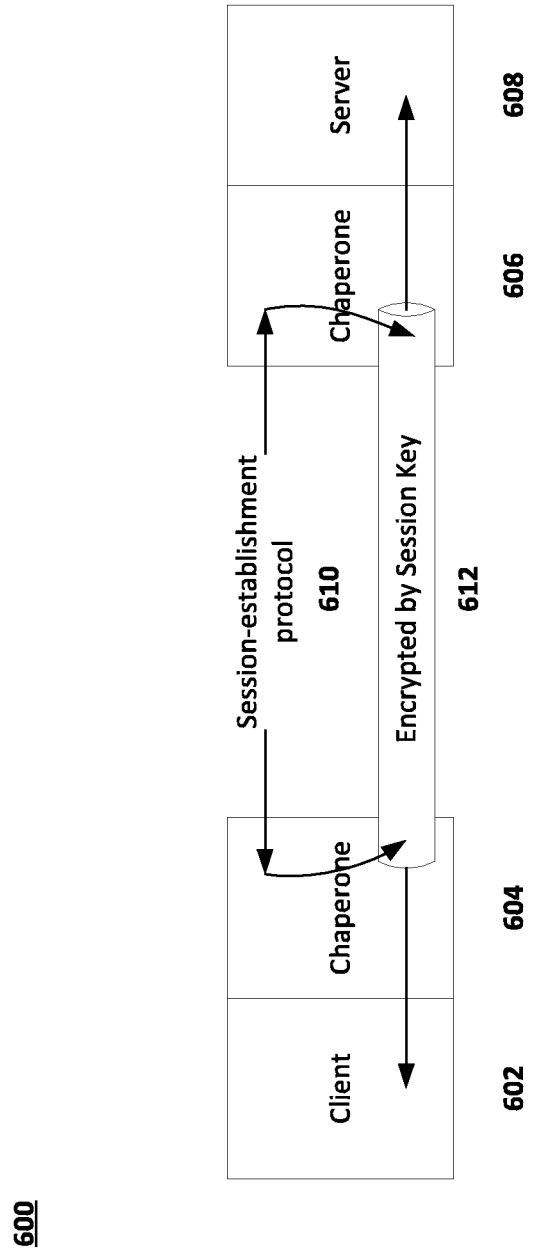
FIG. 6 is a schematic diagram of a session between a client and a server in accordance with embodiments of the present disclosure.

FIG. 6 is a schematic diagram 600 of a chaperone in accordance with embodiments of the present disclosure. In FIG. 6, a client 602 and a chaperone 604 can establish a communications session with a server 608 running its own chaperone 606.

FIG. 6 illustrates the role of the chaperone as the guardian of the communication channel between client 602 and server 608, the holder and the target of a capability, respectively. The chaperone 604 establishes the link 612 encrypted by a session key and replaces it when necessary (i.e., the session key is aged out, or is found out no longer to work). The chaperone does this by negotiation along the lines that are described above with respect to name-based capability negotiation. In some embodiments, the chaperone 606 for example can store or access name-based capabilities on behalf of the client or server, for clients or servers that do not use name-based capabilities to create requests for resources.

FIG. 6 shows the client or server with its chaperone as:

1. a unit (the chaperone forms an integral part of client or server), or as 2. separate entities (the chaperone is placed between a client or server and the network).

The first view would be appropriate for applications operating in the world of capability based communication, while the second applies to the way in which legacy applications can be protected by a chaperone running as part of a chaperone, or as a companion application to a trusted application.

The session-establishment protocol 610 that chaperones use to establish mutual credentials and session keys may use well established transport mechanisms such as RPC, HTTP, REST, 9P, or NFS, or others. What protocol is used inside the encrypted session is up to client and server applications.

Figure 7:
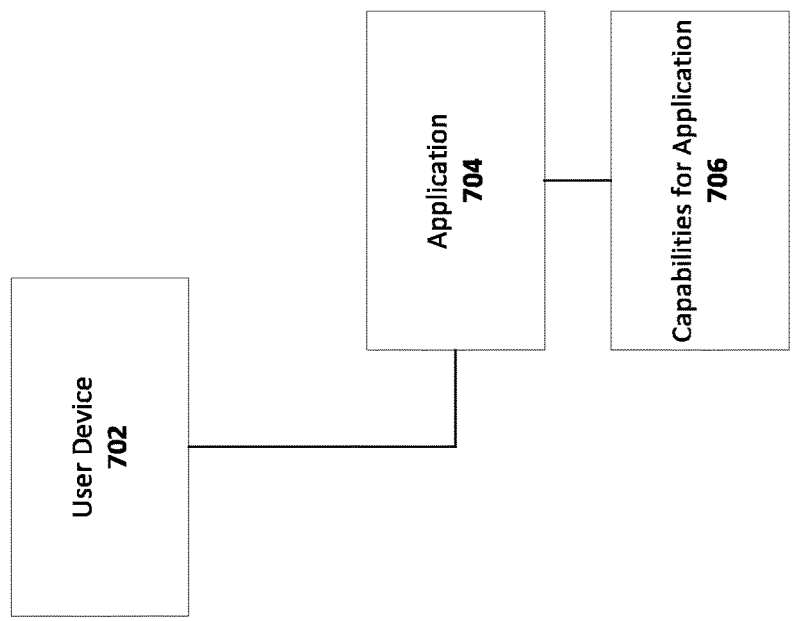
FIG. 7 is a schematic diagram of a user device configured to encapsulate an application with one or more capabilities in accordance with embodiments of the present disclosure.

FIG. 7 is a schematic diagram 700 of a user device in accordance with embodiments of the present disclosure. A user device 702 can be similar to that shown in FIG. 2A. A user device 702 can be a computer, such as a laptop or desktop computer, or a tablet computer, or can be a mobile device, such as a smartphone. User device 702 can also be a work station, enterprise terminal, server, etc. The user device 702 can execute an application 704 in a distributed virtual environment, such as a datacenter that uses servers to provide virtualized resources for the execution of the application 704. The application 704 can be encapsulated by one or more named capabilities 706 that identify authorized resources for the application, and by extension, restrictions of resources that the application is unauthorized to access.

Figure 8:
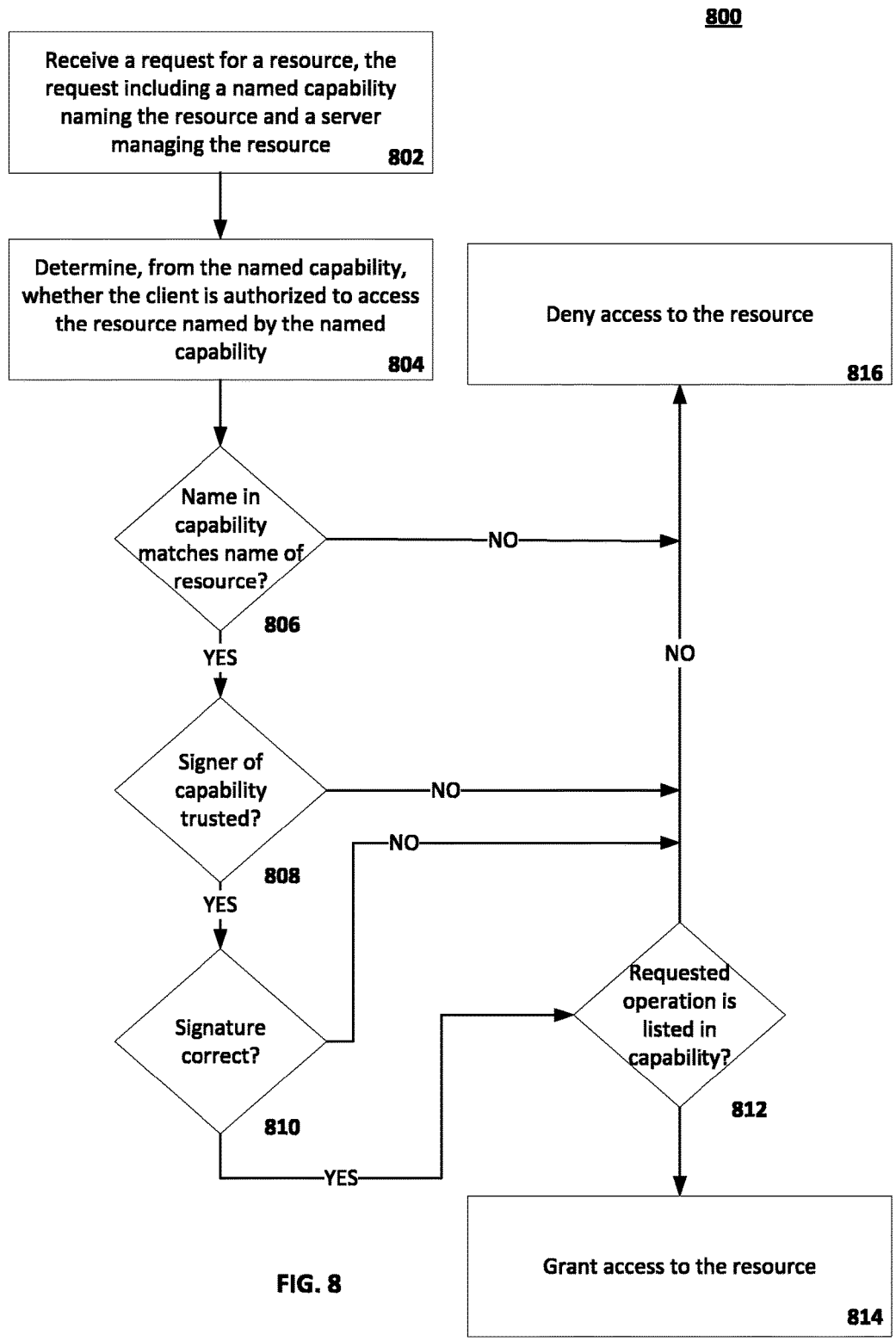
FIG. 8 is a process flow diagram for allocating resources based on one or more named capabilities in accordance with embodiments of the present disclosure.

FIG. 8 is a process flow diagram 800 for controlling access to a resource in a virtual network in accordance with embodiments of the present disclosure. A client can send a request for a resource, which can be received, for example, by a server or server application managing the resource (802). The request can include a named capability that names the resource as well as the server or server application managing the resource. It can be determined, from the named capability, whether the client is authorized to access the resource named by the named capability (804). For example, the server or server application can use the named capability to determine whether the client is authorized to access the resource. In some embodiments, the server or server application can determine whether the client is authorized to access the resource using a chaperone function.

The server or server application can determine whether the client is authorized to access the resource by determining whether the name in the named capability matches the name of the resource (806). If the names do not match, then the server or server application can deny access to the resource (816). If the names do match, the server or server application can determine whether a signer of the named capability is trusted (808). If the signer of the named capability is not trusted, the server or server application can deny the request for the resource (816). If the signer of the named capability is trusted, then the server or server application can determine if the signature certifying the capability is correct (810). If the signature certifying the capability is incorrect, then the server or server application can deny the request for the resource (816). If the signature certifying the capability is correct, then the server or server application can determine whether the requested resource or operation is listed in the capability received with the request (812). If the requested resource or operation is not listed in the capability received with the request, then the server or server application can deny the request for the resource (816). If the requested resource or operation is listed in the capability received with the request, then the server or server application can grant access to the resource (814).

FIG. 9 is a process flow diagram 900 for requesting resources based on one or more named capabilities in accordance with embodiments of the present disclosure. A client can perform one or more of the following operations. The client can be a user device, as described above. The client can be a client application running on a user device or can be a client application running on a server, such as a virtual machine within a datacenter. The client can communicate with one or more servers that manage resources that the client can use to run applications, provide services, access files, etc.

The client can use a named capability for a resource to encode a request for the resource that can only be decoded by a server managing the resource (902). The client can use the named capability to also send the encoded request to a server managing the resource (904). The request can be encoded such that the server managing the resource can decode the request if the server is identified in the capability, and wherein a server managing a resource that is not identified in the capability cannot decode the request.

In some embodiments, the named capability is a first named capability and a resource named in the first named capability is a second named capability. The client can determine that a signer of the first named capability is a trusted entity (906). Based on determining that the signer of the first named capability is a trusted entity, the client can establish a trust relationship for the signer of the second named capability and the identifier of the resource in the second named capability (908). Put differently, if a trusted entity signs a capability for another capability, that signature is a statement that the second capability can be trusted and that the signer of that second capability can be trusted, as well.

Terminology

The following terminology is used:

Principal: A principal is any active entity that can authenticate itself: a service, a machine, an operating system, a process, a corporation, a user.

X=>Y:

If X is true, then Y is true.

P says X:

Usually in a message or statement. Principal P believes that X is true (but, for simplicity, it is ignored whether P believes this now or did so long ago; note that in all certificates and capabilities the period of validity is included).

Q speaks for P:

When principal Q says something, it may be considered as if principal P says it. In other words: if Q speaks for P and Q says X then P says X.

It can be assumed:

P speaks for P—Principals speak for themselves, and

P says Q speaks for P=>Q speaks for P—Principals can appoint others to speak on their behalf A public key K is said to speak for the owner of the private key K1. I.e., anything that can be decrypted with the public key K must have been said by the owner of K1.

An authentication server A is an entity that says things like A says K speaks for P; if that is to be believed, A must speak for P. The statement A makes it known as a certificate: it associates a key K with a principal P.

Similarly, we'll adopt the terminology that a path can speak for its owner, not so much because paths may say things, but because the path can be thought of as a name for the owner (owners can have more than one name).

If path P' is a prefix of P, then P'⊆P and if, in addition, P'≠P (i.e., P' is shorter than P), then P' ⊂ P.

Capability-Based Communication

Communication is initiated by clients. A client C must have a capability containing the path $P_T$ of (an object or interface on) a server S, the server's public key $K_T$, and a prefix of its own path $P_H$. C must also have its own public key pair $\{K_C, K_C^{-1}\}$, the path PC of (an interface on) the client—$P_H \subseteq P_C$—and the certificates to link those to a path that is a prefix of $P_C$.

C uses a name server (which could be (dynamic) DNS, a combination of DNS and purpose built name servers or even a URL lookup) to map $P_T$ to the address of S and it establishes communication with S by sending it the capability and the necessary certificates. Note that the server's path serves two purposes—(1) it allows the server to be found and (2) it allows the server to be identified for purposes of authentication—while the client's path is only needed to allow the client to be identified for authentication.

After this, a handshake protocol between client and server (e.g., IKE, the Internet Key Exchange protocol, or TLS, the Transport-Layer Security protocol) is used to mutually verify the identities of C and S and to establish a session key $K_{CS}$ for the encryption of the remainder of the conversation between C and S. For this, C and S both need their private keys, $K_C^{-1}$ and $K_T^{-1}$, respectively.

A conversation between a client C and a server S thus consists of an unencrypted preamble that does contain encrypted components and follows a standardized protocol, followed by a conversation encrypted with the session key established through that protocol. The encrypted conversation may use any communication protocol whatsoever.

Servers only accept connections from clients that present correct capabilities and that can then authenticate themselves as controlling their paths.

The authentication between C and S happens once, at connection establishment, allowing the relatively high computational cost of authentication using public key encryption, to be amortized over the conversation. Connections could be garbage collected after being idle for a sufficiently long period and they could be automatically (re)established (e.g., by a communications library) as required.

Bootstrapping

Considering an application X with path $P_X$. The "owner" O of X must control $P_O \subseteq P_X$: O speaks for $P_O$—O does not establish an application on a path it does not control. When O creates X, either O or X generates a public key pair $\{K_X, K_X^{-1}\}$.

O then creates the capabilities that allow clients of X to talk to it (i.e., capabilities with target path $P_X$, target key $K_X$ signed by $K_O$). O must also generate the certificate that says $K_X$ speaks for $P_X$ (and this will be believed because O already speaks for $P_O \subseteq P_X$).

Any capabilities that O has to talk to other services can be used by X, because the holder paths in O's capabilities are prefixes of X's path. Therefore, O can judiciously select capabilities to give to X, thus restricting X to what O chooses.

Certification Chains

When one creates a secure web connection (HTTPS, TLS), the server presents a certificate chain to the client. This consists of a series of certificates, the first of which is the server's and each subsequent certificate provides the key for the previous one. The last certificate in the chain must be a root certificate that the client must already have installed (and it is therefore not transmitted in a TLS handshake).

The names on these certificates usually do not indicate any logical hierarchy, nor do they use names that a random web user would recognize.

Capability based certification can be used in a way that certification authorities can transfer signing authorities for only those parts of the URL name space they control.

In other words, a Dutch signing authority, for example, Staat der Nederlanden Root CA, would be restricted to signing only for services in the Dutch ".nl" name space. This does not completely eliminate the problems described above, but it's a step in the right direction. The following is an example:

As mentioned above, a capability can double as a certificate. A capability can be turned into an explicit certificate by adorning it with a certificate attribute (whose value may describe what the certificate is for). Such capabilities would typically have an empty holder path (i.e., can be used by anybody), but it is possible to use a nonempty holder path to indicate validity only for a subset of the user community. In the remainder of this section, the term certificate is used to mean a capability used as a certificate.

Any certification chain must start from a root certificate already in possession of the verifying entity. A special property of a root certificate is that it is trusted by the holder. A root certificate does not necessarily have an empty $P_A$ (but it often does).

If the signer's path of a certificate is $P_A$, and the certificate is trusted, then the certificate may speak for any path P for which $P_A \subseteq P$. In a certification chain, certificate $C_i$ speaks for $C_{i+1}$, for i=0, . . . , $n_1$, where $C_0$ is a root certificate and $C_n$ the certificate needed. Let $P_s^i$ be the signer path of certificate $C_i$ and $P_t^i$ the target path. Then $P_s^i \subseteq P_t^i \forall i \in [0 \ldots n]$, and $P_t^i \subseteq P_s^{i-1} \forall i \in [0 \ldots n)$. This implies that, in a certificate chain, each subsequent path has the previous path as prefix, so a chain could go from "/" to "/a" to "/a/b/c" to "/a/b/c/d," but also from "/" to "/" to "/a" to "/a/b/c/d" to "/a/b/c/d," that is, a certificate can establish a second key for its own path.

A certificate may carry a revocator attribute that lists one or more online revocation authorities. These can be consulted to verify whether a certificate is known to be compromised.

With this arrangement, the regular, self-signed root certificates, typically installed in each browser, would have $P_A$ and $P_T$ both set to the empty path. This implies that $P_A$ and $P_T$ can be the $C_0$ in any certification chain. But any certificates signed by these root authorities should use nonempty target paths. Company's certificate, for example, might have $P_T$ set to /company.com which disqualifies it from signing (universally believable) certificates outside the /company.com subtree.

Self-signed certificates for subtrees (a home network, for example) can safely be installed (after human inspection) as root certificate, because they can only affect the subtree they target.

Thanks to such hierarchical certification, it suddenly becomes feasible to delegate control for named subtrees very effectively and securely (and cheaply too—signing authority certificates still costs a lot of money), while access control can extend beyond the domain name into the object path name.

Revocator attributes, moreover, may refer to local online revocators, thus providing the opportunity for managing the security in a corporate network, an organization or a home network completely locally.

In this disclosure, two additions to key verification are disclosed:

Certificate management for corporate, academic, home, etc. networks, apart from the external certificate that signs the organization's root certificate, can be done completely locally, making it significantly cheaper and more practical to install and use a proper security infrastructure.

Certification paths are explicitly linked to naming subtrees, bringing machine verification of certification chains closer to what human verifiers would do: inspect the names on the certificates in the chain for reasonability. Root certificates, with their null paths, can continue to function as they do today and that must be noted as being an advantage of the present disclosure, because a single worldwide root certificate for everything would not be secure. However, root certificates with paths such as *.edu, *.mil, *.us, *.nl would be useful.

Content Delivery

If a service delivers content (as in what are often called content-delivery networks (CDN), content-centric networks (CCN), or named-data networks (NDN)), capabilities can be used to provide access to the data. Content could be designated as private (i.e., only those in possession of a capability may see the content) or public (i.e., anyone may access it).

The former is something that has been discussed already: a client presents the capability for an object to the server; they mutually verify identities and establish an encrypted channel and the content can be delivered over the channel with privacy and integrity.

In the public content case, since the content is public, the capability for accessing it can be public, too. The holder's path in the capability would be empty (which indicates the object may be accessed from any path) and thus one capability can be shared by all potential clients. Such a public capability only functions as a certificate: a statement intended for clients that vouches for the integrity of the server's public key.

If such certificates are used (disguised as capabilities, of course) in the normal manner, everything will, of course, just work: content will be delivered over mutually authenticated secure channels as if the content was private (secret). But this would be inefficient.

A public capability may carry an attribute specifically labelling it (and the content it refers to) as public. When this attribute is present, content can be delivered not over a mutually authenticated encrypted channel, but instead over a digitally signed channel. In other words, the server may use its private key to sign content and allow it to be picked up by any interested party. The client (consumer) can use its capability to verify the integrity of the delivered content. The server does not have to be on-line for this verification to take place.

Public capabilities thus allow a content-delivery network to be constructed in which content is not encrypted, but content is signed. Signed content can be stored anywhere in the network, so content-delivery servers may cache content to reduce load on the network.

The name-based capabilities introduced in this document provide two essential contributions to largescale distributed computing in general and cloud computing in particular:

Names allow orchestrators to specify associations between interfaces and resources in applications and infrastructure without having to do so by creating additional (virtual) infrastructure in the form of bridges, tunnels, vPaths, VPNs, routing table entries, etc. Some of those may still be needed, but their creation does not have to be part of the orchestration effort, nor is it in the critical correction/security path.

Security is built-in—as it should be in potentially global distributed systems.

Applications can only connect to those entities for which they have access through a capability and the identities of all communicating parties can always be established.

Connections are encrypted (unless there is an explicit decision not to do so on specific connections) and authenticated. The only need for VPNs, vPaths, etc. is dictated by performance and throughput considerations, no longer by security.

Migration from systems as they run today to one in which every application is capability aware can be made fairly straightforward through the assistance of hypervisors, operating systems and/or helper applications instrumented for using capability-based communication.

Each connection, after the capability verification, authentication and key establishment handshake—which essentially turns it into a TLS connection—can be handed over to the conventional communication patterns of previously created communication protocols.

Long-lived applications with recurring connection patterns can reuse previously established session keys until they expire or until they are garbage collected and then reestablish session keys automatically by the applications using them. This greatly reduces any repetitive cost of authentication.

Distributed Systems

All applications that run in data centers or "in the cloud" tend to be distributed. A distributed system, in its academic definition, is one that is more reliable than its constituent parts. Distributed systems are systems in which failures form part of the specification.

Management software for applications in the cloud available today is brittle, unreliable and very difficult to use, very much the opposite of what it should be.

Building reliable distributed systems at very large scales will only happen if there are ways of separating the concerns of process placement, inter-process communication, security, failure recovery, performance monitoring and accounting/billing. The unreliability of cloud management systems is largely due to the complete lack of separation of these concerns. Before virtualization and mobility became more popular, one machine in the Internet could, at least in principle, communicate with any other using an address and the Internet Protocol. Thus routing traffic was handled independently from running applications.

This disclosure provides a handle for reintroducing proper separation of concerns, while also recognizing that the world has become more complex: there is mobility, and virtualization is often desired, there are more and more serious security threats, and the dependence on distributed systems has become much greater.

Naming resources, applications, processes, interfaces, and machines gives control over what is connected to, while controlling where things are and how to connect to them can be handled separately. Security, in global distributed systems, will have to be so fundamental that it is described as part of every interaction.

Layered Orchestration

This disclosure describes an approach to naming the entities that processes and machines talk to, and to make sure the communication can happen securely.

This disclosure describes a way to separate concerns in a natural way. One view of orchestration this disclosure describes is a layered one in which three layers can easily be identified:

1. A layer in which individual programs are configured and run, by using named infrastructural resources, and setting up chaperones and wards as necessary. The external interfaces needed by the programs are provided as a set of capabilities.

This set describes how a program should connect to its environment, while the actual setup of programs/applications can be made a purely local affair, restricted to this layer.

2. A layer in which distributed (i.e., fault tolerant) applications are configured and managed (e.g., crash recovery, performance monitoring). How individual components are run is delegated to Layer 1; in this layer, we're concerned with the ensemble of components into a coherent and fault-tolerant whole. At this layer, the requirements for independent failure are also considered, by allocating resources in independent-failure domains. Distributed applications are created by creating multiple Layer1 components and generating the capabilities that specify the application's topology. Failures can be masked by allowing multiple entities to respond to the same capability, or by supplying fresh capabilities as needed.

3. A scaling layer in which additional distributed applications can be created or removed, based on demand, possibly with geographical influences. At this level, there can be a concern with finding appropriate data centers (i.e., processing resources), with data placement (concerns about national legislation can be important here), etc.

An independent layered system provides the actual name-based connectivity: mapping names to addresses, making sure data is delivered securely, etc. To have most of the security concerns already addressed by establishing authenticated and encrypted end-to-end connections provides a vital simplification of the interprocess communication infrastructure. Note that the communication infrastructure itself can also be viewed as a distributed system that uses multiple levels of naming. Switches, routers, firewalls, even individual Ethernet interfaces can also be named.

The name-to-address mapping can be largely or wholly performed using DNS, dynamic or static, and, again, security is taken care of independently. A DNS failure may result in denial of service but does not have to result in data corruption or theft.

Content-Delivery Networks

Named capabilities can be used in public and private content delivery systems, allow content to be delivered only to authorized subscribers and allow that to be done with verifiable and auditable billing.

Capabilities in their public form (public attribute set and client path empty) can be used to change the authentication handshake for content delivery into one where content is delivered signed by the server, but not encrypted by it (with integrity but without secrecy). This allows capability-based systems to work much like CDNs, but obviates the need for caching servers to authenticate as the original generator of content. Any server could cache data and integrity checks are still end-to-end.

Capabilities used as described herein with a null holder path and a directive not to encrypt the connection but only to sign content provide the possibility to emulate a CCN. For example, named capabilities allow names to be used to route towards content and keys in named capabilities allow verification of signed content, just like in CCN. But named capabilities can do more.

In a conventional CDN setting, content can be given a name of the form content.provider.com/item-sought. In this example, assume the original content provider is provider.com and the path content.provider.com is somehow routed to the nearest CDN representative. Since the owner of provider.com speaks for content.provider.com, the content provider can generate a certificate that allows the CDN to serve the content subtree. If CDN and provider share the secrete key, both content provider and CDN server can generate capabilities that allow the clientele access.

The CDN servers can deliver content that is both signed and encrypted to authenticated holders of named capabilities. CDN servers can also provide content that is merely signed to anonymous capability holders. In this way, named capabilities can combine the strengths of conventional CDNs with those of CCN while adding an access-control infrastructure as well. Additionally, named capabilities allow audit trails to be maintained and, therefore, a mutually verifiable billing system to be created.

Named capabilities can unify the disparate mechanisms used in CDN and CCN named data networks and do so allowing management of both public (unencrypted but verified) and private (encrypted and verified) data.

Variations and Implementations

Within the context of the disclosure, a network used herein represents a series of points, nodes, or network elements of interconnected communication paths for receiving and transmitting packets of information that propagate through a communication system. A network offers communicative interface between sources and/or hosts, and may be any local area network (LAN), wireless local area network (WLAN), metropolitan area network (MAN), Intranet, Extranet, Internet, WAN, virtual private network (VPN), or any other appropriate architecture or system that facilitates communications in a network environment depending on the network topology. A network can comprise any number of hardware or software elements coupled to (and in communication with) each other through a communications medium.

In one particular instance, the architecture of the present disclosure can be associated with a service provider deployment. In other examples, the architecture of the present disclosure would be equally applicable to other communication environments, such as an enterprise wide area network (WAN) deployment, The architecture of the present disclosure may include a configuration capable of transmission control protocol/internet protocol (TCP/IP) communications for the transmission and/or reception of packets in a network.

As used herein in this Specification, the term 'network element' is meant to encompass any of the aforementioned elements, as well as servers (physical or virtually implemented on physical hardware), machines (physical or virtually implemented on physical hardware), end user devices, routers, switches, cable boxes, gateways, bridges, loadbalancers, firewalls, inline service nodes, proxies, processors, modules, or any other suitable device, component, element, proprietary appliance, or object operable to exchange, receive, and transmit information in a network environment. These network elements may include any suitable hardware, software, components, modules, interfaces, or objects that facilitate the network service header features/operations thereof. This may be inclusive of appropriate algorithms and communication protocols that allow for the effective exchange of data or information.

In one implementation, nodes with NSH capabilities may include software to achieve (or to foster) the functions discussed herein for providing the NSH-related features/ functions where the software is executed on one or more processors to carry out the functions. This could include the implementation of instances of service functions, service header processors, metadata augmentation modules and/or any other suitable element that would foster the activities discussed herein. Additionally, each of these elements can have an internal structure (e.g., a processor, a memory element, etc.) to facilitate some of the operations described herein. In other embodiments, these functions may be executed externally to these elements, or included in some other network element to achieve the intended functionality. Alternatively, these nodes may include software (or reciprocating software) that can coordinate with other network elements in order to achieve the functions described herein. In still other embodiments, one or several devices may include any suitable algorithms, hardware, software, components, modules, interfaces, or objects that facilitate the operations thereof.

In certain example implementations, the NSH-related functions outlined herein may be implemented by logic encoded in one or more non-transitory, tangible media (e.g., embedded logic provided in an application specific integrated circuit [ASIC], digital signal processor [DSP] instructions, software [potentially inclusive of object code and source code] to be executed by one or more processors, or other similar machine, etc.). In some of these instances, one or more memory elements can store data used for the operations described herein. This includes the memory element being able to store instructions (e.g., software, code, etc.) that are executed to carry out the activities described in this Specification. The memory element is further configured to store databases or metadata disclosed herein. The processor can execute any type of instructions associated with the data to achieve the operations detailed herein in this Specification. In one example, the processor could transform an element or an article (e.g., data) from one state or thing to another state or thing. In another example, the activities outlined herein may be implemented with fixed logic or programmable logic (e.g., software/computer instructions executed by the processor) and the elements identified herein could be some type of a programmable processor, programmable digital logic (e.g., a field programmable gate array [FPGA], an erasable programmable read only memory (EPROM), an electrically erasable programmable ROM (EEPROM)) or an ASIC that includes digital logic, software, code, electronic instructions, or any suitable combination thereof.

Any of these elements (e.g., the network elements, service nodes, etc.) can include memory elements for storing information to be used in achieving the NSH-related features, as outlined herein. Additionally, each of these devices may include a processor that can execute software or an algorithm to perform the NSH-related features as discussed in this Specification. These devices may further keep information in any suitable memory element [random access memory (RAM), ROM, EPROM, EEPROM, ASIC, etc.], software, hardware, or in any other suitable component, device, element, or object where appropriate and based on particular needs. Any of the memory items discussed herein should be construed as being encompassed within the broad term 'memory element.' Similarly, any of the potential processing elements, modules, and machines described in this Specification should be construed as being encompassed within the broad term 'processor.' Each of the network elements can also include suitable interfaces for receiving, transmitting, and/or otherwise communicating data or information in a network environment.

Additionally, it should be noted that with the examples provided above, interaction may be described in terms of two, three, or four network elements. However, this has been done for purposes of clarity and example only. In certain cases, it may be easier to describe one or more of the functionalities of a given set of flows by only referencing a limited number of network elements. It should be appreciated that the systems described herein are readily scalable and, further, can accommodate a large number of components, as well as more complicated/sophisticated arrangements and configurations. Accordingly, the examples provided should not limit the scope or inhibit the broad techniques of using and augmenting NSH metadata, as potentially applied to a myriad of other architectures.

It is also important to note that the various steps described herein illustrate only some of the possible scenarios that may be executed by, or within, the nodes with NSH capabilities described herein. Some of these steps may be deleted or removed where appropriate, or these steps may be modified or changed considerably without departing from the scope of the present disclosure. In addition, a number of these operations have been described as being executed concurrently with, or in parallel to, one or more additional operations. However, the timing of these operations may be altered considerably. The preceding operational flows have been offered for purposes of example and discussion. Substantial flexibility is provided by nodes with NSH capabilities in that any suitable arrangements, chronologies, configurations, and timing mechanisms may be provided without departing from the teachings of the present disclosure.

It should also be noted that many of the previous discussions may imply a single client-server relationship. In reality, there is a multitude of servers in the delivery tier in certain implementations of the present disclosure. Moreover, the present disclosure can readily be extended to apply to intervening servers further upstream in the architecture, though this is not necessarily correlated to the 'm' clients that are passing through the 'n' servers. Any such permutations, scaling, and configurations are clearly within the broad scope of the present disclosure.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph six (6) of 35 U.S.C. section 112 as it exists on the date of the filing hereof unless the words "means for" or "step for" are specifically used in the particular claims; and (b) does not intend, by any statement in the specification, to limit this disclosure in any way that is not otherwise reflected in the appended claims.

What is claimed is:

1. A method performed at a server managing a resource for providing access to a resource in a distributed network, the method comprising: receiving from a client for request for access to a resource, the request for access comprising a name of the resource, a requested operation of the resource, and a distinct named capability, the named capability including the name of the resource, the requested operation, a signature and a server managing the resource;

first determining, whether the client is authorized to access the resource identified by the named capability;

second determining that the name of the resource in the named capability matches the name of the resource in the request for access;

third determining that the requested operation of the request for access is listed in the named capability;

fourth determining that the signature is correct and represents a trusted signer;

granting access to the resource named by the named capability in response to at least positive results of the first, second, third and fourth determining; and preventing the server managing the resource from receiving the request for access to the resource in response to a negative result of any of the first, second, third and fourth determining wherein the first, second, third and fourth determining are performed by a chaperone service function residing within a communication path between the client and the server managing the resource.

2. The method of claim 1, further comprising:

denying access to the resource based on a capability that does not provide authorization for the client to have made the request.

3. The method of claim 1, further wherein the chaperone performs the preventing.

4. The method of claim 1, wherein the chaperone is provided by a hypervisor, and wherein the server is a virtual machine managed by the hypervisor.

5. The method of claim 1, wherein the chaperone is provided by an operating system, and wherein the server runs in a container managed by the operating system.

6. The method of claim 1, wherein the chaperone is provided by a software library that is compiled with an implementation of the server.

7. The method of claim 1, wherein the chaperone resides in a network switch or interface associated with a host device hosting the server, and is configured to provide or deny communication for the server.

8. A hardware computer configured to manage a resource and connected to a network, the hardware computer comprising:

at least one memory element having instructions stored thereon;

at least one processor coupled to the at least one memory element and configured to execute the instructions to cause a chaperone hosted by the hardware computer to:

receive from a client a request for access to a resource, the request access comprising a name of the resource, a requested operation of the resource, and a distinct named capability, the named capability including the name of the resource, the requested operation, a signature and a server managing the resource;

first determine, whether the client is authorized to access the resource identified by the named capability;

second determine that the name of the resource in the named capability matches the name of the resource in the request for access;

third determine that the requested operation of the request for access is listed in the named capability;

fourth determine that the signature is correct and represents a trusted signer;

grant access to the resource named in response to at least positive results of the first, second, third and fourth determine: and prevent the server managing the resource from receiving the request for access to the resource in response to a negative result of any of the first, second, third and fourth determine, wherein the first, second, third and fourth determine are performed by a chaperone service function associated with the client accessing the resource.

9. The hardware computer of claim 8, the at least one processor configured to execute instructions to cause the chaperone to:

deny access to the resource based on a capability that does not provide authorization for the client to have made the request.

10. The hardware computer of claim 8, wherein the chaperone executes the prevent.

11. A computer-readable non-transitory medium comprising one or more instructions for allocating resources in a virtual network, the instructions when executed on a processor are operable to:

receive from a client a request for access to a resource, the request for access comprising a name of the resource, a requested operation of the resource, and a distinct named capability, the named capability including the name of the resource, the requested operation, a signature and a server managing the resource;

first determine whether the client is authorized to access the resource identified by the named capability;

second determine that the name of the resource in the named capability matches the name of the resource in the request for access;

third determine that the requested operation of the request for access is listed in the named capability;

fourth determine that the signature is correct and represents a trusted signer;

grant access to the resource named in response to at least positive results of the first, second, third and fourth determine; and prevent the server managing the resource from receiving the request for access to the resource in response to a negative result of any of the first, second, third and fourth determine wherein the first, second, third and fourth determine are performed by a chaperone service function associated with a server managing the resource.

12. The computer-readable non-transitory medium of claim 11, the instructions when executed on a processor are operable to:

deny access to the resource based on a capability that does not provide authorization for the client to have made the request.

13. The computer-readable non-transitory medium of claim 11, the instructions when executed on a processor are operable to:

wherein the chaperone executes the prevent.

14. The computer-readable non-transitory medium of claim 11, wherein the named capability is a resource managed by a signer of the named capability; the instructions when executed on a processor are operable to:

identify from the named capability a root prefix and an identifier of a resource;

determine that a signer of the named capability is a trusted entity based on the root prefix;

determine that a resource identified in the named capability is trusted based on determining that the signer of the named capability is trusted; and establish a trust relationship for the root prefix and the identifier of the resource.

\* \* \* \* \*